Oct. 28, 1930.  F. J. RAYFIELD  1,779,640
UNLOADING VALVE
Filed Nov. 15, 1929
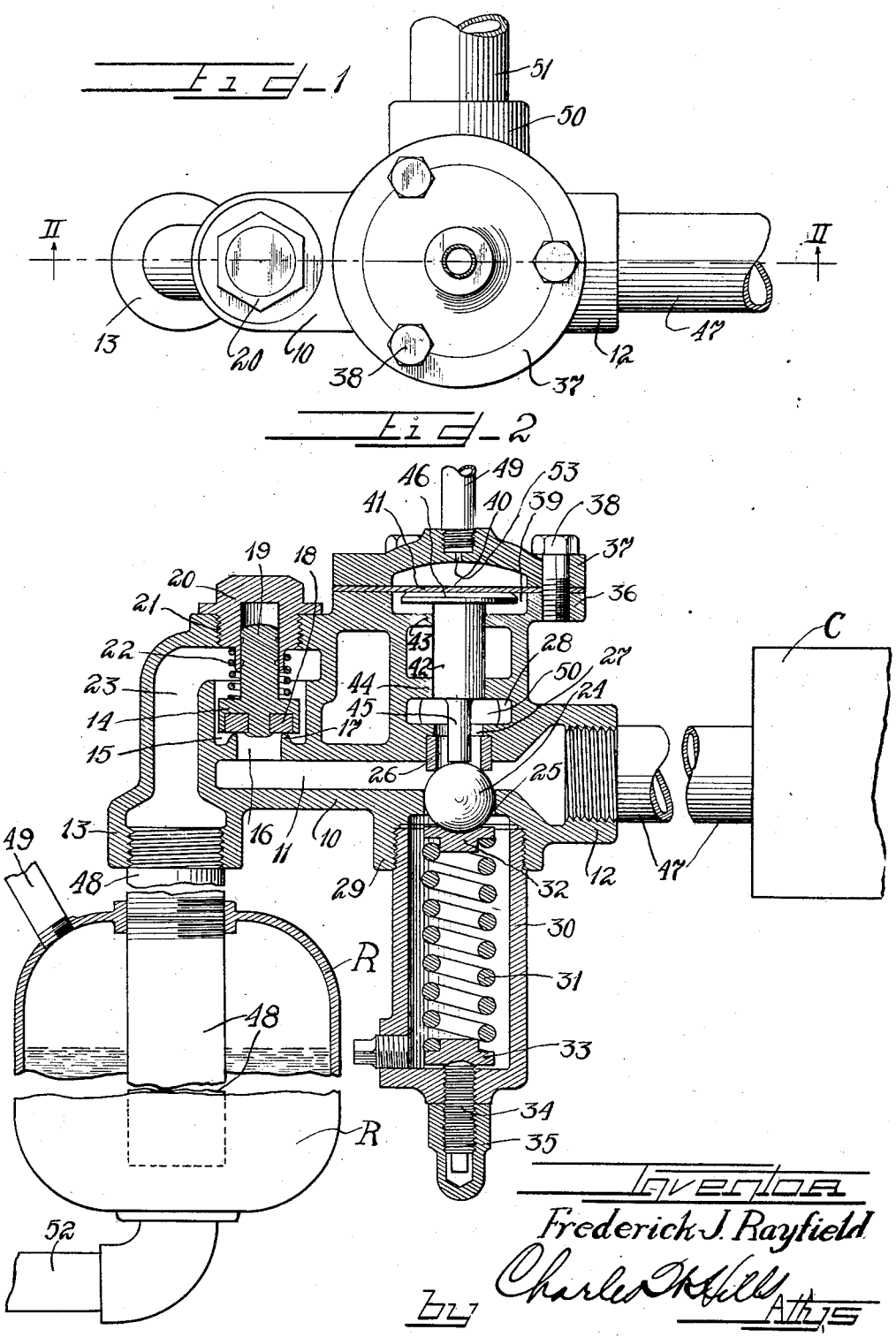

Patented Oct. 28, 1930

1,779,640

UNITED STATES PATENT OFFICE

FREDERICK J. RAYFIELD, OF CHICAGO, ILLINOIS, ASSIGNOR TO CHAMPION PNEUMATIC MACHINERY CO., OF CHICAGO, ILLINOIS, A CORPORATION OF ILLINOIS

UNLOADING VALVE

Application filed November 15, 1929. Serial No. 407,387.

My invention relates to unloading valves particularly adaptable for use in connection with fluid pumps for regulating the pressure and for automatically releasing fluid from the pump and relieving the pressure at the end of each pumping operation, thereby assuring an easy "no load" start of the pump and preventing the possibility of burning up the motor through starting against heavy loads.

The object of the invention is to produce a simple, substantial, and efficient valve of this type which is leakproof, positive in action, and which does not readily get out of order.

The various features of my invention will be apparent from the specification and the drawings, on which drawings:

Figure 1 is a plan view of the valve structure, and Figure 2 is a section on plane II—II of Figure 1, and showing the connection of the valve structure in service.

In the construction and arrangement shown, the valve structure comprises a body 10 which may be in the form of an integral casting and which provides the fluid chamber or passageway 11 extending horizontally. The chamber 11 has the inlet end 12 at one end, and at its other end communicates with the outlet 13 past a check valve structure. This check valve structure comprises the valve disc 14 operable in the valve chamber or pocket 15 formed in the frame 10. A valve passage 16 connects the chamber 11 with the valve pocket and within the pocket this passage is surrounded by the annular seat 17 for the valve disc, the valve disc preferably carrying a seating washer 18 of suitable material, as for example, rubber. The valve disc has a guide stem 19 reciprocable in the plug 20 threaded into the opening 21 of the frame 10. A compression spring 22 between the plug and the valve disc tends to hold the valve disc against its seat. The upper end of the valve pocket is connected by the passageway 23 with the outlet 13.

In the passage 16 intermediate the inlet 12 and the check valve is interposed the relief valve 24 preferably in the form of a ball. This valve projects through an opening 25 in the lower wall of the passage 11 and is spring pressed against a seating bushing 26 secured in the passage 27 leading from the chamber 11 to an intermediate chamber 28 in the frame 10. Below the opening 25 the frame 10 has the threaded boss 29 for receiving the spring barrel 30 for the compression spring 31 which normally closes the ball valve. The spring extends between the abutment blocks 32 and 33, the block 32 supporting the ball valve and the block 33 forming an abutment for the adjusting screw 34 extending upwardly through the bottom of the spring barrel. By means of this screw the pressure of the spring against the ball valve can be adjusted. A cap 35 receives and protects the outer end of the adjusting screw.

At the top of the frame 10 and concentric with the valve seat bushing 26 is the flange 36 for supporting the head or cover 37 which is detachably secured by means of screws 38. Within the flange 36 is the depression or pocket 39, and the cover 37 has a registering depression 40, the depressions forming a chamber for a diaphragm 41 secured between the flange 36 and the cover. A stem 42 is vertically reciprocal in and guided by the transverse walls 43 and 44 and has its lower end 45 of reduced diameter and extending through the passage 27 and the valve seat bushing 26 to engage with the ball valve 24. At its upper end the stem has the head 46 within the depression 39 below the diaphragm and is engaged by the diaphragm.

The inlet 12 of the valve structure is connected by a suitable pipe 47 with the outlet of a fluid pump diagrammatically shown and designated by the reference character C. The outlet 13 of the valve structure is connected by a suitable pipe 48 with the bottom of a pressure stabilizing reservoir R into which the fluid, such as water, is to be put under pressure and stored. A pipe 49 extending from the cover 37 connects the chamber 40 above the diaphragm with the air space at the top of the reservoir so that such chamber is subject to the pressure of the air in the reservoir. The liquid under pressure in the reservoir R is conducted through a service pipe 52. The relief outlet 50 extends from the chamber 28 with which the valve passage 27 communicates and this outlet may be connected by a pipe 51 with the intake of the pump.

The fluid is pumped by the pump C into the reservoir R, and while the pressure in the reservoir is below a predetermined value the fluid will flow around the ball valve and through the valve passage 16 and past the check valve 14 and through the passageway 23 and the outlet 13 and pipe 48 to the reservoir. The check valve prevents back flow from the reservoir to the compressor. As soon as the pressure in the reservoir reaches a point where the pressure against the diaphragm will overcome the force of the spring 31, the ball valve will be moved from its seat and the passageway 27 will be opened, and if the pump is still running it will discharge through the relief passageway 27 to the atmosphere or back to the pump inlet. In other words, the pump will then run idle. As liquid is withdrawn from the reservoir the pressure drops and the spring 31 will overcome the lowered pressure on the diaphragm and will raise the ball valve back into position against its seat to close the outlet passage 27, and then the fluid from the pump will again flow through the chamber 11 and the check valve to the reservoir to restore the pressure. Thus, after each operation of the pump to restore the pressure, the pressure automatically causes opening of the ball valve and the pump is relieved of pressure through the outlet 50, so that when the ball valve is re-closed by the force of the spring 31, the pump will gradually rebuild the pressure in the reservoir. As long as the discharge from the reservoir is insufficient to reduce the pressure below a point at which the spring overcomes the diaphragm pressure, the valve remains open and the fluid is wholly or partly circulated through the pump. By means of the adjusting screw 34 adjustment can readily be made for minimum and maximum pressures at which the ball valve will be seated by a spring or opened by the pressure against the diaphragm. Below the minimum pressure the spring will be free to close the ball valve, and when maximum pressure is reached, the diaphragm pressure will overcome the spring pressure and open the ball valve for the release of the pump.

The communication of the pressure pipe 49 with the diaphragm chamber 40 is preferably through the restricted orifice 53. With this arrangement the operation of the diaphragm is stabilized and chattering of the ball valve is prevented.

My improved valve structure is of simple and economical construction and it is leakproof, the spherical ball valve always accurately and securely engaging in seat bushing 26. By means of the screw 34 quick and accurate adjustment can be made for the proper pressure range between "cut in" and "cut out" of the pump. After adjustment the valve operation is entirely automatic and its efficient operation at the prescribed pressures is maintained.

While I have illustrated and described a particular construction embodying the features of my invention and have shown it as applied to a particular use, I do not wish to be understood as intending to limit it thereto, as modifications and changes may be made without departing from the spirit and principles of the invention.

I claim as my invention:

1. In an unloading valve of the class described, the combination of a frame having a main passageway therethrough provided with a fluid inlet and a fluid main outlet, a check valve interposed between said inlet and said outlet for preventing back flow from said outlet, there being a release outlet from said main passageway between said inlet and said check valve, a ball valve for said release outlet, a spring tending to force said ball valve to close said release outlet and means controlled by the pressure of the fluid delivered to said main outlet for forcing said ball valve open against the pressure of its spring whereby to connect said release outlet with said passageway.

2. In an unloading valve of the class described, the combination of a frame having a main passageway therethrough provided with a fluid inlet and a fluid main outlet, a check valve interposed between said inlet and outlet for preventing back flow from said outlet, there being a release outlet from said main passageway between said inlet and said check valve, a ball valve for controlling said release outlet, a spring tending to force said ball valve to close said release outlet, a diaphragm, a stem engaging said diaphragm, said diaphragm being subjected to the pressure of the fluid delivered from said main outlet for moving said ball valve against the force of its spring to open said release outlet to said main passageway when the pressure reaches a predetermined value.

3. An unloading valve of the class described comprising a frame having a main passageway therethrough provided with a fluid inlet and a fluid main outlet, a check valve interposed in said passageway between said inlet and main outlet, there being a pressure release outlet from said main passageway at a point between said fluid inlet and said check valve, a valve seat in said release outlet, a ball valve, a compression spring tending to force said ball valve against said seat to close the release outlet, means forming a diaphragm chamber, a diaphragm in said diaphragm chamber, a stem extending from said diaphragm coaxially with said spring, and a pressure connection for said diaphragm chamber for subjecting said diaphragm to the pressure of the fluid delivered from said main outlet, said diaphragm under the subjected pressure moving its stem into engagement with said ball valve to force said ball valve from its seat against the pressure of said spring to open said main passage to said release outlet when the pressure reaches a predetermined value.

4. An unloading valve of the class described comprising a frame having a main fluid passageway therethrough provided with a fluid inlet and a fluid main outlet, a check valve interposed in said main passageway between said inlet and said main outlet, there being a release outlet from said passageway at a point between said inlet and said check valve, a ball valve for said release outlet, a compression spring tending to hold said ball valve to close said release outlet, means forming a pressure chamber, a diaphragm in said chamber, a stem extending from said diaphragm co-axially with said spring, a connection to said pressure chamber for subjecting said diaphragm to the pressure of the fluid delivered from said main outlet, said diaphragm acting under predetermined pressure in said chamber to move its stem to force said ball valve against the pressure of its spring to open said release outlet, the connection with said chamber being through a restricted orifice whereby to stabilize the operation of said diaphragm and prevent chattering of said ball valve.

5. An unloading valve of the class described comprising a frame having a main fluid passageway therethrough provided with a fluid inlet and a fluid main outlet, a check valve interposed in said main passageway between said inlet and said main outlet, there being a release outlet from said passageway, a valve for said release outlet, means tending to hold said release valve to close said release outlet, means forming a pressure chamber, a connection to said pressure chamber from said main fluid outlet, and a pressure responsive element in said pressure chamber adapted to act under predetermined pressure in said chamber to move said release valve to open said release outlet, the connection to said pressure chamber from said main fluid outlet being through a restricted orifice whereby to stabilize the operation of said pressure responsive element and prevent chattering of said release valve.

In testimony whereof I have hereunto subscribed by name at Chicago, Cook County, Illinois.

FREDERICK J. RAYFIELD.